May 5, 1959        A. M. HARRIS        2,885,614

SERVOSYSTEM ANGULAR MOTION TRANSMITTING APPARATUS

Filed Jan. 6, 1955

INVENTOR
Aaron M. Harris
BY
ATTORNEY

United States Patent Office 2,885,614
Patented May 5, 1959

2,885,614

SERVOSYSTEM ANGULAR MOTION TRANSMITTING APPARATUS

Aaron M. Harris, Brooklyn, N.Y., assignor, by mesne assignments, to United Aircraft Corporation, East Hartford, Conn., a corporation of Delaware Application January 6, 1955, Serial No. 480,228

10 Claims. (Cl. 318—30)

This invention relates to angular motion transmitting apparatus and particularly to an alternating current motor of an induction type used in servomechanisms.

More specifically this invention relates to a novel construction of a servomotor.

The conventional synchro system consists of two similar electrical machines, each comprising a rotor having a single phase winding and a stator having polyphase windings. One of the machines is called a generator or transmitter and the other machine a motor or receiver. The polyphase windings of the two machines are interconnected and the single phase connections are energized from a common source of periodically varying or alternating current. Thus, when the rotor of the transmitter unit is angularly displaced the axis of the magnetic field produced thereby is correspondingly displaced inducing voltages in the polyphase windings. The induced voltages in the receiver polyphase windings produce a magnetic field causing the receiver rotor to rotate an angular distance in correspondence with the distance traversed by the transmitter rotor. Because of this self-synchronizing property of interconnected synchro systems, they have found wide application in industry for remote indication and control purposes. However, it is apparent that in the type system described, the output torque produced by the synchro motor is inadequate for many applications, particularly remote control applications. Therefore, ordinarily the torque output of the system is increased by employing a servomotor and interposing a power amplifier between the receiver rotor winding and the servomotor. The addition of a power amplifier adds considerably to the weight, bulk and expense of a complete servomechanism unit. Moreover, it increases the number of components susceptible to mechanical failure.

Accordingly, it is an object of this invention to provide a servomechanism system which eliminates the power amplifier, and is capable of producing a power output at least as great as systems employing the power amplifier.

It is a further object of this invention to provide an electrical damper means on the servomotor to reduce surging, oscillations and overshooting thereof.

In accordance with a first aspect of this invention there is provided a synchro system comprising an induction motor having a rotor, a fixed stator winding and a movable stator winding. Means are provided for rotating the movable stator winding, in response to the transmitter rotor movement, whereby a low level of power in the stator windings of the transmitter produces a high level of power output in the servomotor.

In accordance with another aspect of this invention there is provided a servomotor comprising a rotor, a fixed stator winding and a movable stator winding rotatable with respect to the fixed stator winding.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
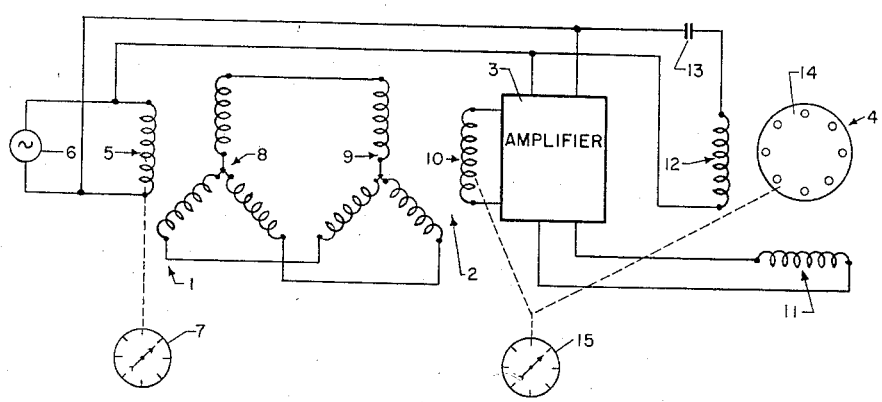
Fig. 1 is a schematic diagram of a conventional synchro system.

Referring first to Fig. 1, there is illustrated a conventional synchro system comprising a transmitter unit generally indicated at 1, a control transformer generally indicated at 2, an amplifier 3, and a servomotor generally indicated at 4. The transmitter unit 1 comprises a rotor 5 having a single phase winding coupled to a source of periodically varying or alternating current 6. The rotor 5 is connected mechanically to a mechanism, for example a prime mover 7, whose movement is to be measured or indicated by the servomechanism. The stator of the transmitter comprises three-phase windings 8 connected respectively to windings 9 of the stator in the control transformer 2. The rotor winding 10 of the control transformer 2 is connected to the input of the amplifier 3 which may be of the vacuum tube, gas tube or magnetic type. The amplifier is coupled to the source 6 and delivers an output similar in frequency and phase to that of the input but greatly increased in power. The amplifier output is coupled to one phase winding (control phase) 11 of the two-phase servomotor 4. The other phase winding (main phase) 12 is connected to the source 6 through a phase-shift capacitor 13, whereby the energy applied to the main phase is shifted approximately 90° electrically to the energy delivered by the amplifier. The rotor 14 of the servomotor 4 is preferably of the squirrel cage type, and is mechanically connected through gearing to the rotor 10 of the control transformer 2 and to an indicator 15, or other means of measuring or indicating the rotor movement. The electrical connections to the amplifier and motor are such that any output from the control transformer tends to rotate the servomotor in the direction which reduces the amount of output.

Figure 2:
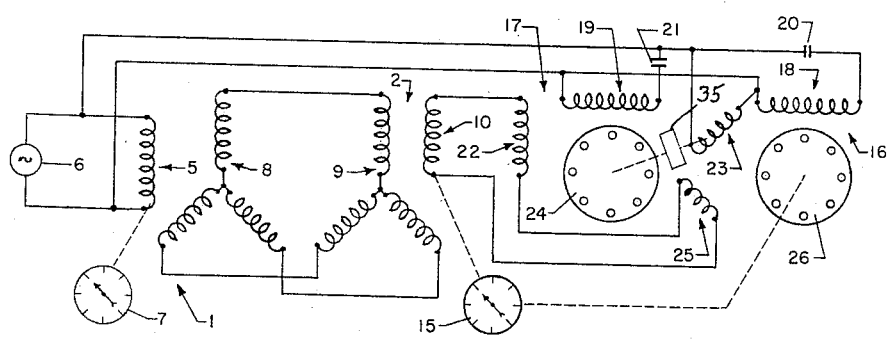
Fig. 2 is a schematic diagram of a synchro system connected in accordance with the invention.

Referring now to Fig. 2, there is illustrated a servo system connected in accordance with the invention. Those parts which are similar to the conventional system have been identified by the same characters as used in Fig. 1. The servo system includes the transmitter unit 1, control transformer 2, source of alternating current 6, indicators 7 and 15, and in addition, comprises first and second two-phase servomotors generally indicated at 16 and 17 respectively; the motor 17 replacing the amplifier 3. The main phase windings 18 and 19, of the motors 16 and 17 respectively, are connected to the source 6 through phase-shifting capacitors 20 and 21. Motor 17 includes a control winding 22 fed by the rotor 10 of control transformer 2.

The motor 17 is used to control the space phase relation of the two windings wound on the stator of motor 16. Stator winding 18 is fixed to the motor housing, however, control winding 23 is rotatable 90 degrees, or one half pole pitch, in either direction. The currents in the two windings 18 and 23 are separated 90 electrical degrees. Rotor 24 of motor 17 is mechanically connected, directly or by gearing, to the movable stator winding 23. The normal junction of the windings 18 and 23 is such that similar poles are aligned in an axial direction when no torque is produced. However, when the movable stator winding 23 is displaced a small angle from alignment with the fixed winding, then a torque is developed proportional to the sine of the angle moved, Thus, by properly proportioning the connecting gearing, indicated diagrammatically and identified by the reference character 35 in Figure 2, between rotor 24 and movable winding 23, a very small amount of power in the control transformer output can cause motor 16 to produce a very large power output through its rotor 26 which rapidly turns the rotor 10 of the control transformer 2, to a position of zero output. Rotation of rotor 26 produces a corresponding change in the reading of the indicator device 15.

As will be readily understood by those skilled in the art, owing to the fact that both stator windings 18 and 23 have the same voltage impressed thereon, the reaction torque of motor 16 will be shared equally between these windings. Since winding 23 is driven from the rotor 24 of torque motor 17, the torque on rotor 26 will be approximately twice the torque on rotor 24. Thus the interposition of the motor 17 between the control transformer 2 and the servomotor 16 provides a substantially doubled torque, assuming a direct connection between rotor 24 and movable stator 30. This arrangement in addition permits a much greater increase in the power output from motor 16. Let us assume that reduction gearing affording a large mechanical advantage is interposed between the servomotor rotor and the control transformer rotor of a conventional servo system of the prior art employing no amplifier. This reduction gearing requires a large number of revolutions of the servomotor rotor in order to produce the required displacement of the control transformer rotor. It will be seen that the servomotor rotor must rotate at a relatively high speed. At this speed it induces a counterelectromotive force in its stator control winding. As is understood in the art, the counter E.M.F. opposes the error signal fed to the motor control winding. The limit of speed of the rotor is reached when the counter E.M.F. equals the control winding signal. As a result, the servomotor speed is severely limited. This is not the case in the system of this invention. It is only required that rotor 24 of motor 17 produce sufficient torque to position winding 23. Since windings 18 and 23 of motor 16 carry line voltage to overcome any counter E.M.F. induced in the windings by movement of rotor 26, rotor 26 may rotate at any speed approaching synchronous speed. Owing to this high speed of rotation permitted for rotor 26, a gear reduction system affording a large mechanical advantage may be connected between rotor 26 and rotor 10. In other words, while the interposition of the motor 17 results in only an approximate doubling of torque from rotor 24 to rotor 26, it permits rotor 26 to operate at a speed approaching synchronous speed with the result that the power output from motor 16 is greatly increased.

In accordance with another feature of the invention there is provided a damper winding 25 mounted on the movable stator 23 of motor 16 and connected in series, but wound in opposition, with the control winding 22 of motor 17 and rotor winding 10 of the transformer 2. The damper winding 25 is separated 90 electrical degrees from the movable stator winding 23. Accordingly the current in the damper winding has a component which opposes the current in the transformer rotor winding 10 and is of particular significance when motor 16 is rotating at a high speed and will tend to reduce the current and torque of the motor 17, and also reduce the space angle between the two stator windings of motor 16. This will reduce the speed of the motor 16 and thus prevent over-shooting or oscillation. The value of the damping current is also a function of the space angle between the stator windings of motor 16; i.e., the amount of current in the damper winding is directly proportional to the sine of the space angle, which is the requirement for efficient damping. It will be readily appreciated by those skilled in the art that the damping effect of winding 25 is of primary importance in the region of the null or point at which the error signal induced in winding 10 is zero. At the null point, winding 23 is aligned axially with winding 16. It will be remembered that winding 25 as is explained hereinabove is carried by the movable stator 23 and is displaced 90° electrically from winding 23. When winding 23 is in its null position, winding 25 is also in quadrature with winding 18. Consequently, the only voltage induced in compensating winding 25 will be proportional to the speed of rotor 26.

Figure 3:
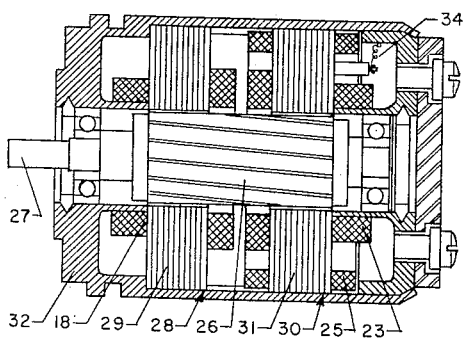
Fig. 3 is a cross-sectional view of the servomotor of the invention.
Figure 4:
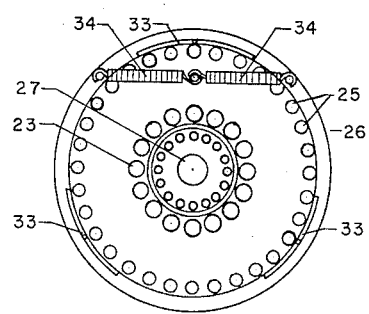
Fig. 4 is an end-view of the servomotor with the end cap and ball bearing race removed.

There is shown in Figs. 3 and 4 a practical construction of the servomotor 16, exemplifying one aspect of the invention. The windings of motor 16 which are shown schematically in Figure 2 are indicated by like reference numerals in Figures 3 and 4. Stator windings 18, 23, and 25 are shown in Figures 3 and 4 as they are actually distributed on the respective stationary and movable stators. The motor comprises a rotor 26 of the squirrel cage type to which there is attached a shaft 27. Surrounding the rotor 26 is a fixed stator 28 comprising laminated iron sheets 29, main phase winding 18, and a movable stator 30 comprising laminated iron sheets 31 and control phase winding 23. The fixed stator 28 is rigidly attached to the motor housing 32, by any well known means such as cement. The movable stator 30 is rotatably mounted on three needle rollers 33, shown best in Fig. 4. The damper winding 25 is wound on the outside of the movable stator 30. As is well known in the art, winding 18 is a distributed winding on the stationary stator 28 and windings 23 and 25 are distributed on stator 30. The distribution of windings 23 and 25 is such that the poles formed by winding 23 are displaced 90° from the poles formed by winding 25. In operation the housing 32 is rigidly mounted so that rotation of the axes of the magnetic field produced by its stator windings, causes the rotor to rotate a relative amount. As described in connection with Fig. 2, the movable stator 30 is normally positioned with respect to the fixed stator 28, so that similar poles are aligned axially. The aligned position is preferably urged by spring means; however, in some applications of the motor, no springs are required and the movable stator is free to move in the two pole pitch region without mechanical restraint.

The mechanical connection between the movable stator and rotor 24 of motor 17 is not shown and may be any suitable mechanical or electrical linkage means.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. An angular motion transmitting apparatus including in combination a synchronous transmitter having a rotor and a stator, a source of periodically varying electrical energy, means for energizing said rotor from said source to produce an electromagnetic field in said stator, a servomotor having a rotor and a fixed stator and a movable stator, means for energizing said servomotor stator windings from said source to produce a stator electromagnetic field in said servomotor, and means responsive to a displacement of said transmitter stator electromagnetic field for moving said movable stator to effect a corresponding displacement of the stator electromagnetic field of the servomotor.

2. Apparatus as in claim 1 in which said servomotor includes respective windings carried by said fixed stator and said movable stator, means connecting one of said windings to said source and phase shifting means connecting the other of said windings to said source.

3. Apparatus as in claim 1 in which said responsive means includes a control transformer having a rotor and a stator, means for connecting said control transformer stator to said transmitter stator to produce an error signal in said control transformer rotor and means responsive to said error signal for moving said movable stator.

4. Apparatus as in claim 1 in which said responsive means includes a control transformer having a stator and a rotor, means connecting said control transformer stator to said transmitter stator to generate an error signal in said control transformer rotor, a second servomotor having a rotor and respective main phase and control phase windings, means connecting said main phase winding to said source, means connecting said control phase winding to said control transformer rotor to produce a torque in said second motor rotor proportional to said error signal and a linkage for moving said movable stator a distance proportional to the torque produced in said second motor rotor.

5. An angular motion transmitting apparatus including in combination a synchronous transmitter having a rotor, a control transformer having a rotor and means for producing in said control transformer rotor an error signal proportional to the difference in angular positions of said rotors, a first servomotor having a rotor and a control phase winding, means connecting said control phase winding to said control transformer winding to generate in said first servomotor rotor a torque proportional to said error signal, a second servomotor including a rotor and a movable stator, means linking said first servomotor to said movable stator to produce a movement of said movable stator proportional to said error signal, movement of said movable stator producing a rotation of said second servomotor rotor and means for driving said control transformer rotor from said second servomotor rotor.

6. Apparatus as in claim 5 including means for indicating the amount of movement of said transmitter rotor and said control transformer rotor.

7. Apparatus as in claim 5 in which said second servomotor includes a compensating winding.

8. A servomotor including in combination a rotor, a fixed stator winding and a movable stator winding, said fixed and movable stator windings being normally disposed so that like poles are normally aligned with respect to the axis of said stator.

9. A servomotor including in combination a fixed stator winding, a movable stator winding and a compensating winding for producing a damping effect on said servomotor.

10. A servomotor including in combination a rotor, a fixed stator winding, a movable stator winding and a compensating winding carried by said movable stator winding and producing a damping effect on said servomotor, said compensating winding being displaced 90 electrical degrees from said movable stator winding.

References Cited in the file of this patent

UNITED STATES PATENTS

| | | |
|---|---|---|
| 2,115,086 | Riggs | Apr. 26, 1938 |
| 2,489,689 | Wald | Nov. 29, 1949 |

OTHER REFERENCES

Thomson, S. P.: Dynamo-Electric Machinery, vol. I, page 263, last paragraph, Spon & Chamberlain, London, 1904.

Steinmetz, C. P.: Theory and Calculation of Electrical Apparatus, p. 221, Fig. 69A, McGraw-Hill, New York, 1917.

Jackson, D. C. and Jackson, J. P.: Alternating Currents and Alternating Current Machinery, The MacMillan Co., New York, 1914, p. 788.